US012338951B2

(12) United States Patent
Eschhofen

(10) Patent No.: US 12,338,951 B2
(45) Date of Patent: Jun. 24, 2025

(54) PRESSURIZED ADHESIVE TANK SYSTEM

(71) Applicant: Altenloh, Brinck & Co. U.S., Inc., Bryan, OH (US)

(72) Inventor: Nicholas S. Eschhofen, Bryan, OH (US)

(73) Assignee: Altenloh, Brinck & Co. U.S., Inc., Bryan, OH (US)

( * ) Notice: Subject to any disclaimer, the term of this patent is extended or adjusted under 35 U.S.C. 154(b) by 91 days.

(21) Appl. No.: 17/863,931

(22) Filed: Jul. 13, 2022

(65) Prior Publication Data

US 2023/0018122 A1 Jan. 19, 2023

Related U.S. Application Data

(60) Provisional application No. 63/221,045, filed on Jul. 13, 2021.

(51) Int. Cl.
*F17C 13/04* (2006.01)

(52) U.S. Cl.
CPC ...... *F17C 13/04* (2013.01); *F17C 2201/0109* (2013.01); *F17C 2201/032* (2013.01); *F17C 2205/0391* (2013.01); *F17C 2223/035* (2013.01); *F17C 2250/01* (2013.01)

(58) Field of Classification Search
CPC .............. F17C 13/04; F17C 2201/0109; F17C 2201/032; F17C 2205/0391; F17C 2223/035; F17C 2250/01; B05B 9/04; B05B 9/047; B05B 7/0408; B05B 9/0833; B05B 11/026; B05B 7/2467; B05B 7/0433
See application file for complete search history.

(56) References Cited

U.S. PATENT DOCUMENTS 2,659,629 A * 11/1953 Graham ............... B65D 83/666 222/399
2,822,002 A * 2/1958 Mack ..................... B65D 83/64 222/399
8,336,733 B2 * 12/2012 Laws .................... B05B 9/0833 222/399
10,473,269 B2 * 11/2019 Gisin ........................ F17C 7/00
2006/0169725 A1 * 8/2006 Grill .................... B67D 1/0406 222/399

* cited by examiner

*Primary Examiner* — Shawn M Braden
(74) *Attorney, Agent, or Firm* — Gardner, Linn, Burkhart & Ondersma LLP

(57) ABSTRACT

The present invention provides fluid storage and dispensing tanks and methods for storing reactive fluids, such as component fluids for two-component adhesives, foams, and sealants. The tanks contain a reactive fluid for storage until the fluid is desired to be dispensed. The tank includes a subject fluid storage chamber that contains the subject fluid independent of any propellants or other fluids or gases. When the tank is desired to be used, a propellant, such as a volatile propellant or a compressed gas (e.g. compressed air) are introduced directly into or around the storage chamber to facilitate dispensing the subject fluid from the tank. The tank may include a propellant storage chamber inside the canister body and adjacent to the subject fluid storage chamber. The propellant chamber is selectively punctured when the tank is to be used. The tank may include a flexible bladder defining the storage chamber.

10 Claims, 5 Drawing Sheets

PRESSURIZED ADHESIVE TANK SYSTEM

CROSS REFERENCE TO RELATED APPLICATION

The present application claims priority of U.S. provisional application Ser. No. 63/221,045 filed Jul. 13, 2021, which is hereby incorporated by reference herein in its entirety.

FIELD OF THE INVENTION

The present invention is directed to fluid storage tanks, and in particular chemical adhesive fluid storage tanks for storing and dispensing liquid or foam adhesives, components and sealants.

BACKGROUND OF THE INVENTION

Multi-component mixing and dispensing systems are commonly used to spray or otherwise dispense highly reactive fluids that are stored in separate containers and that flow under pressure through separate fluid lines of a dispensing system from which they are ultimately dispensed or applied. Such fluids are typically highly reactive and sensitive to one another or the atmosphere and can begin a chemical reaction as soon as they come into contact with one another, the atmosphere, or other chemicals or substances, such as propellants.

In typical adhesive storage and dispensing tanks, the subject or component fluid (e.g. a component fluid for two-component adhesives, foams, etc.) is stored with a blowing agent or propellant to supply pressure. When the tank is opened to release the subject fluid, the propellant is intended to force the subject fluid out of the tank. As the subject fluid is exhausted, propellant evaporates and expands in volume into the space above the subject fluid, thereby sustaining a generally consistent pressure above the subject fluid. The sustained pressure forces the subject fluid out of the tank through the tanks discharge conduit and valve. When subject fluids are stored in a storage tank and intermixed with a propellant, the subject fluids and/or propellants can degrade over the stored life of the tank and subject fluid. Typically, once a fluid tank is finished (either completely emptied or contaminated due to being open for too long) the finished tank is discarded.

Adhesives that are supplied in pressurized tanks are pressurized to dispense at an equal or desired ratio, where propellants, blowing agents, and solvents may be added to each chemical tank to assist or enable the fluid components to be dispensed. The propellants and blowing agents may be partially or completely absorbed by the chemicals to be dispensed, and may subsequently evaporate therefrom. Multi component chemicals supplied and dispensed from pressurized tanks are typically supplied with tank pressures of less than two-hundred and fifty pounds per square inch (<250 psi), where the discharge rate is sensitive to temperature.

Common construction adhesives may include two-component polyurethane foam adhesives used to secure roofing components, including roofing membranes and insulation layers. Thermoplastic polyolefin (TPO) fleece-backed roofing membranes and other single-ply and multi-ply roofing materials are typically adhered using such adhesives, as well as are layers of rigid foam insulation. The adhesive can be spray applied using differing spray guns to apply different adhesive layers for a desired coverage.

SUMMARY OF THE INVENTION

The present invention provides fluid storage and dispensing tank embodiments and methods for storing reactive fluids, such as component fluids of a two-component adhesive, foam, sealant, etc. The disclosed tanks provide for the storage of a subject fluid (e.g. a component fluid for a two-component reactive adhesive fluid) in a manner that maintains the subject fluid independent of any propellants (e.g. high pressure gas blowing agents, compressed air, and the like). The tanks provide for the introduction of a propellant at the time that a user desires to dispense the subject fluid from the tank. By storing the subject fluid independent of propellants, the shelf-life of the store fluid may be extended. The tanks may also be refillable and reusable, thereby reducing waste generated from the use of tanks containing reactive or volatile fluids.

According to one form of the present invention, a sealed, dual-chamber fluid storage and dispensing tank is provided for storing and subsequent discharging of a subject fluid, such as a component fluid for a two-component reactive adhesive. The fluid tank has a main canister body that houses a first storage chamber defined by an outer wall of the canister body. The first storage chamber is provided for storing the subject fluid. A second storage chamber is defined by a sealed membrane or wall that is disposed inside of or adjacent to the first storage chamber inside of the canister body. The second storage chamber is provided for storing a propellant independent of the subject fluid. The tank includes a fill and discharge valve at an upper portion of the canister body and the valve is selectively operable to open or close/seal the canister body to permit filling or discharging of the first storage chamber. The valve includes a fill and discharge port for receiving or discharging a subject fluid to/from the first storage chamber. The tank includes a puncture device that is selectively operable to puncture the membrane of the second storage chamber to release the stored propellant into the first storage chamber. A fluid pickup tube or discharge conduit is provided between the first storage chamber and the fill and discharge port of the valve to allow the subject fluid to travel from the first storage chamber and out of the tank through the discharge port. When the valve is open and the propellant is released into the first storage chamber, the propellant functions to force the subject fluid into the fluid discharge conduit and out of the fill and discharge port, preferably to a downstream fluid dispensing system (e.g. spray gun, bead applicator, etc.).

In one aspect of the sealed membrane of the second storage chamber is formed by a rigid cylindrical body that remains sealed until it is punctured by the puncture device. In this aspect, the fluid discharge conduit extends through the cylindrical body of the second storage chamber without any fluid communication between the second storage chamber and the fluid discharge conduit.

In another aspect, the puncture device includes a slidable pin that is manipulatable from an exterior of the canister body. The slideable pin is actuated by applying a pressing force to the pin which urges the pin to slide toward the sealed membrane of the second storage chamber until the pin punctures the sealed membrane.

In another form of the present invention, a sealed, single chamber fluid storage and dispensing tank is provided for storing and subsequent discharging of a subject fluid. The fluid tank includes a main canister body defining a subject fluid storage chamber. The tank includes a fill and discharge valve at an upper portion of the canister body and the valve is selectively operable to open or close/seal the canister body to permit filling or discharge of the storage chamber. The valve includes a fill and discharge port for receiving or discharging a subject fluid to/from the storage chamber. A fluid pickup tube or discharge conduit is provided between the storage chamber and the fill and discharge port of the valve. The tank includes an auxiliary gas connection port for receiving a propellant in the form of an auxiliary compressed gas (preferably compressed air) from a remote source. When the valve is open and when a compressed gas is introduced through the gas connection port into the storage chamber, the compressed gas forces the subject fluid toward and into the fluid discharge conduit and then out of the fill and discharge port.

In one aspect, the gas connection port is positioned at the same end of the tank as the valve and at a generally opposite end of the tank from an inlet end of the fluid discharge conduit. As such, when the tank is positioned in a proper, upright orientation, the gas connection port is above the subject fluid inside the storage chamber and the compressed gas will act on the upper layer of the subject fluid in order to force the fluid downward toward the inlet end of the discharge conduit.

In still another form of the present invention, another sealed, dual-chambered fluid storage and dispensing tank is provided for storing and subsequent discharging of a subject fluid, such as a reactive adhesive. The fluid tank includes a main canister body and a flexible membrane or wall or bladder inside of the canister body. The flexible membrane defines a subject fluid storage chamber within the tank. A majority of the flexible membrane is unattached or independent of the canister body such that the flexible membrane is readily deformable apart from the canister body. The tank includes a fill and discharge valve at an upper portion of the canister body. The valve is selectively operable to open or close/seal the canister body to permit filling or discharge of the storage chamber. The valve includes a fill and discharge port for receiving or discharging a subject fluid into/from the storage chamber. A fluid pickup tube or discharge conduit is positioned inside of the tank and bladder between the storage chamber and the fill and discharge port of the valve. The tank includes an auxiliary gas connection port for receiving an auxiliary compressed gas (preferably compressed air) from a remote source. Compressed gas that is introduced through the gas connection port fills a void defined between an outer wall of the canister body and the flexible membrane without entering the flexible membrane. When the valve is open and when a compressed gas is introduced through the gas connection port into the main canister body, the compressed gas exerts a pressure on the exterior of the flexible membrane to cause the flexible membrane to deform, collapse, and/or contract which thereby forces the subject fluid into the fluid discharge conduit and then out of the fill and discharge port.

In one aspect, the flexible membrane is formed of a resilient material such that the storage chamber is refillable via the fill and discharge port and thereby the tank is reusable. When the compressed gas is continuously introduced into the tank, the flexible membrane and the fluid discharge conduit cooperate to force substantially all of the subject fluid into the fluid discharge conduit and thereby discharge substantially all of the subject fluid from the tank regardless of the orientation of the tank. For example, the tank may be laying on its side with the fluid discharge conduit oriented horizontally and the tank will still function to discharge to the subject fluid. Optionally, an anti-collapse apparatus may be provided to prevent the flexible membrane from collapsing against the opening orifice of the fluid discharge conduit and thereby block the discharge of the subject fluid through the discharge conduit. The anti-collapse apparatus may include multiple holes or apertures formed along the conduit to facilitate or permit a substantially free transfer of the subject fluid from the storage chamber into the conduit via multiple locations in addition to the main opening orifice and/or the anti-collapse apparatus may include a generally rigid mesh basket positioned around a portion of the fluid discharge conduit and the opening orifice of the fluid discharge conduit. The mesh basket is configured to impede the membrane from contacting or blocking the opening orifice of the fluid discharge conduit.

In yet still another form of the present invention, another sealed, dual-chambered fluid storage and dispensing tank is provided for storing and subsequent discharging of a subject fluid, such as a reactive adhesive. The fluid tank includes a main canister body and a piston moveably disposed at an interior of the main canister body. The piston forms a seal with an interior wall of the main canister body thereby separating the dual-chamber storage chamber into an upper chamber and a lower subject fluid storage chamber. The tank includes a fill and discharge valve at an upper portion of the canister body. The valve is selectively operable to open or close/seal the canister body to permit filling or discharge of the subject fluid storage chamber. The valve includes a fill and discharge port for receiving or discharging a subject fluid into/from the subject fluid storage chamber. A fluid pickup tube or discharge conduit is positioned inside of the tank and subject fluid storage chamber between the subject fluid storage chamber and the fill and discharge port of the valve. The tank includes an auxiliary gas connection port for receiving an auxiliary compressed gas (preferably compressed air) from a remote source. Compressed gas that is introduced through the gas connection port fills a void in the upper portion of the tank above the piston without entering the subject fluid storage chamber. When the valve is open and when a compressed gas is introduced through the gas connection port into the main canister body, the compressed gas exerts a pressure on the upper portion of the piston to cause the piston to move toward the subject fluid thereby forcing the subject fluid into the fluid discharge conduit and then out of the fill and discharge port.

Preferably, the piston may include a seal around an outer circumference of the piston and forming a seal between the interior wall of the main canister body and the piston and a seal around an inner circumference of the piston and forming a seal between the fluid discharge conduit and the piston. Optionally, the gas connection port is positioned proximate the valve and at a generally opposite end of the canister body from an inlet end of the fluid discharge conduit.

In yet another form of the present invention, a method is provided for storing a subject fluid in a sealed tank in the absence of a propellant and subsequently discharging the stored subject fluid. The method includes filing a subject fluid storage chamber of a fluid storage and dispensing tank with a subject fluid and filling a propellant storage chamber of the tank with a propellant. The propellant storage chamber is positioned inside of the tank and either inside of or adjacent to the subject fluid storage chamber. The method includes storing the tank filled with the subject fluid until required. When a user desire to user the tank, the method includes coupling a fluid discharge system (e.g. spray gun apparatus) to a fill and discharge port of a tank valve of the tank and then opening the tank valve. Then puncturing a membrane of the propellant storage chamber with a puncture device that is accessible from an exterior of the tank to release the propellant into the subject fluid storage chamber. The propellant expands inside the subject fluid storage chamber above the subject fluid and as the volume of the propellant inside the subject fluid storage chamber increases, the subject fluid is forced into the fluid discharge conduit and toward the fill and discharge port. The method includes discharging the subject fluid from the tank and into the fluid discharge system via the fill and discharge port.

In yet another form of the present invention, a method is provided for storing a subject fluid in a sealed tank in the absence of a propellant and subsequently discharging the stored subject fluid. The method includes filling a subject fluid storage chamber of a fluid storage and dispensing tank with a subject fluid. The subject fluid storage chamber is defined by the outer wall of the tank. The tank also includes an auxiliary gas connection port. The method includes storing the tank filled with the subject fluid until required. When the tank is required, the method includes coupling a fluid discharge system to a fill and discharge port of a tank valve of the tank and coupling an auxiliary compressed gas system to the gas connection port. The method includes opening the tank valve and then introducing a compressed gas into the tank through the gas connection port. Finally, the method includes discharging the subject fluid from the tank through a fluid discharge conduit disposed inside the tank and into the fluid discharge system via the fill and discharge port. The discharging of the subject fluid from the tank is facilitated by the compressed gas filling a void in the tank above the subject fluid and as the pressure above the subject fluid increases due to the increased volume of compressed gas, the subject fluid is forced into the fluid discharge conduit and out of the fill and discharge port.

In still another form of the present invention, a method is provided for storing a subject fluid in a sealed tank in the absence of a propellant and subsequently discharging the stored subject fluid. The method includes filling a subject fluid storage chamber of a fluid storage and dispensing tank with a subject fluid. The tank includes an auxiliary gas connection port in the outer wall of the tank. Preferably, the subject fluid storage chamber is defined by a flexible membrane or bladder that is positioned inside of the tank and, accordingly, the flexible membrane is filled with the subject fluid. The method includes storing the tank filled with the subject fluid until required. When the tank is required, the method includes coupling a fluid discharge system to a fill and discharge port of a tank valve of the tank and coupling an auxiliary compressed gas system to the gas connection port. The tank valve is opened and a compressed gas is introduced through the gas connection port and into a void space between the outer wall of the tank and the exterior of the flexible membrane. The method then includes discharging the subject fluid from the tank through a fluid discharge conduit positioned inside the flexible membrane and then into the fluid discharge system via the fill and discharge port. The discharging of the subject fluid from the tank is facilitated by the compressed gas filling a void in the tank defined between an outer wall of the tank and the exterior of the flexible membrane (without the compressed gas entering the flexible membrane). The compressed gas exerts a pressure on the exterior of the flexible membrane such that the flexible membrane deforms or collapses and thereby forces the subject fluid into the fluid discharge conduit and out of the fill and discharge port. Optionally, the flexible membrane of the tank may be refilled with a subject fluid via the fill and discharge port and the fluid discharge conduit. The valve can then be closed and the re-filled tank can be stored until required.

In yet still another form of the present invention, a method is provided for storing a subject fluid in a sealed tank in the absence of a propellant and subsequently discharging the stored subject fluid. The method includes filling a subject fluid storage chamber of a fluid storage and dispensing tank with a subject fluid, the subject fluid storage chamber defined by the outer wall of the tank and a piston disposed at an interior of the tank. The piston forming a seal with the interior of the outer wall of the tank. The subject fluid storage chamber is filled with the subject fluid. The method includes storing the tank filled with the subject fluid until required. When the tank is required, the method includes coupling a fluid discharge system to a fill and discharge port of a tank valve of the tank and coupling an auxiliary compressed gas system to the gas connection port. The tank valve is opened and a compressed gas is introduced through the gas connection port and into a void space in an upper chamber between the tank valve and the upper portion of the piston. The method then includes discharging the subject fluid from the tank through a fluid discharge conduit positioned inside the tank and extending through the piston. The subject fluid is then discharged into the fluid discharge system via the fill and discharge port. The discharging of the subject fluid from the tank is facilitated by the compressed gas filling a void in the upper chamber of the tank (without the compressed gas entering the subject fluid storage chamber). The compressed gas exerts a pressure on the upper portion of the piston such that the piston moves toward the subject fluid and thereby the subject fluid is forced into the fluid discharge conduit and out of the fill and discharge port. Optionally, the subject fluid storage chamber of the tank may be refilled with a subject fluid via the fill and discharge port and the fluid discharge conduit. The valve can then be closed and the re-filled tank can be stored until required.

Accordingly, the present invention provides fluid storage tanks and methods of storage for reactive fluids in the absence of propellants. The tanks may also contain and store propellants independent of the reactive fluid, or the tanks may contain and store only the reactive fluids and then be configured to receive an auxiliary propellant from a remote source, such as compressed air from an air compressor. The reactive fluid storage chambers of the tanks may be refillable such that the tank may be reused instead of discarding the empty tank canister, as is commonly done with commonly available fluid tanks. The tanks may be configured to operate in any orientation, as opposed to only generally upright orientations. The tanks are particularly well suited for the storage of reactive fluids, however it will be appreciated that the tanks are also useful the storage and dispensing of non-reactive, non-volatile, and/or inert fluids, such as water for example.

These and other objects, advantages, purposes and features of this invention will become apparent upon review of the following specification in conjunction with the drawings.

BRIEF DESCRIPTION OF THE DRAWINGS

Like reference numerals in the various drawings indicate like elements.

DESCRIPTION OF THE PREFERRED EMBODIMENTS

Figure 9:
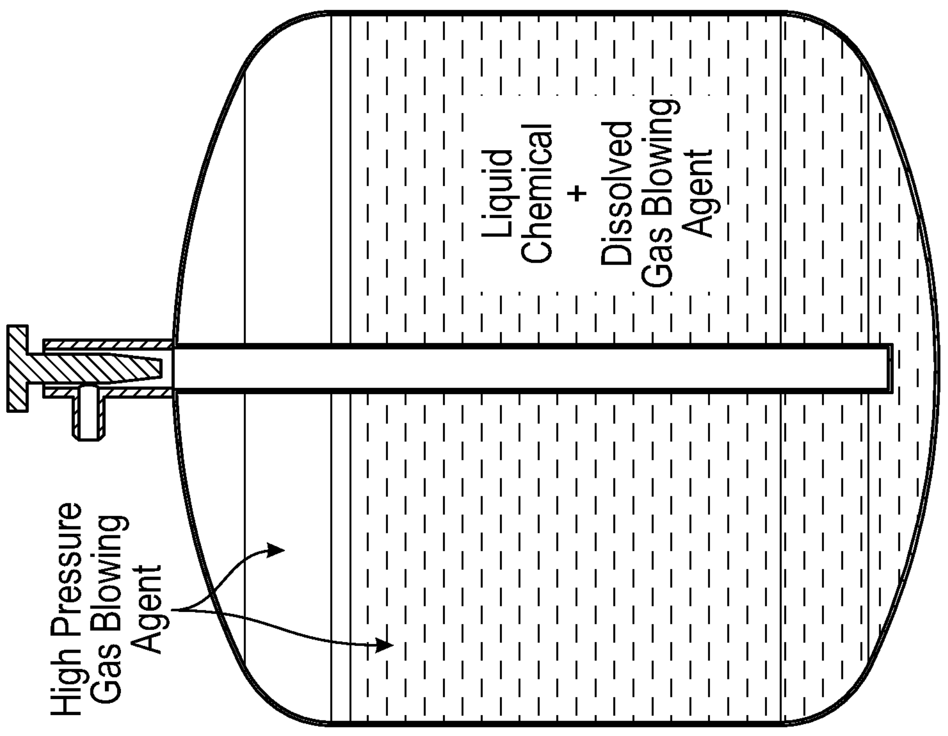
FIG. 9 (Prior Art)
FIG. 9 is a sectional side view of a fluid storage and dispensing tank having a propellant intermixed with a stored subject fluid, as commonly known in the prior art.
Figure 10:
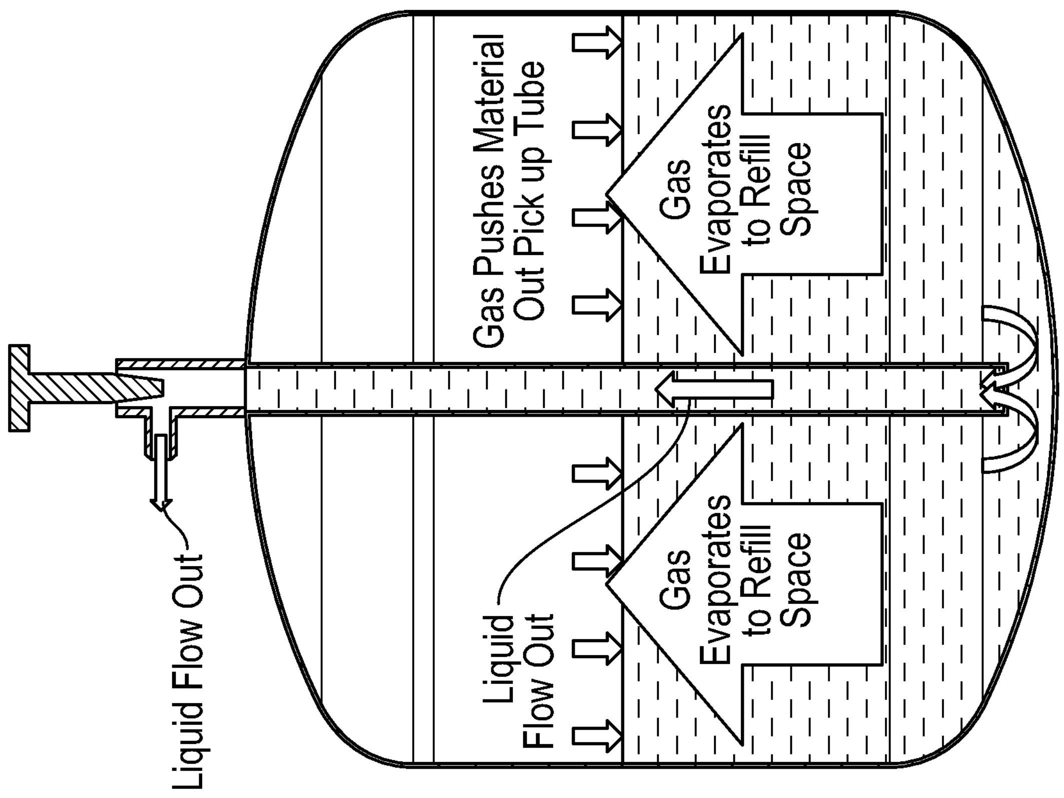
FIG. 10 (Prior Art)
FIG. 10 is another sectional side view of the tank of FIG. 9, depicting the operation of the tank when dispensing the subject fluid.

Referring now to the drawings and the illustrative embodiments depicted therein, methods and fluid tanks are provided for the storage and subsequent discharge of a subject fluid, such as component fluids utilized in two-component reactive adhesives or insulation foams, for example. The tanks store and discharge the subject fluid at about two hundred to two hundred and fifty pounds per square inch (200-250 psi). Commonly used fluid storage and discharge tanks typically integrate a propellant with the subject fluid (as illustrated in FIGS. 9 and 10), where the tank of FIGS. 9 and 10 illustrate one tank of a two part system in which two tanks are each used to separately store one of the two liquid chemicals that are later mixed together upon discharge to form the adhesive. The fluid tanks and methods in accordance with the disclosure of the present invention provide for storage of the subject fluid so as to be separated from a blowing agent, such as independently of or without a blowing agent, as will be described in further detail below. Thus, the fluid tanks and methods described herein provide for extended shelf life when storing the tanks, with the fluid tanks being particularly well suited for storage and dispensing of foam adhesives. For example, the methods and tanks are well suited for storage and dispensing of separate component fluids that are used in two-component adhesives and sealants sold and marketed by Altenloh, Brinck & Co. U.S., Inc. under the trade name TRUFAST.

Figure 2:
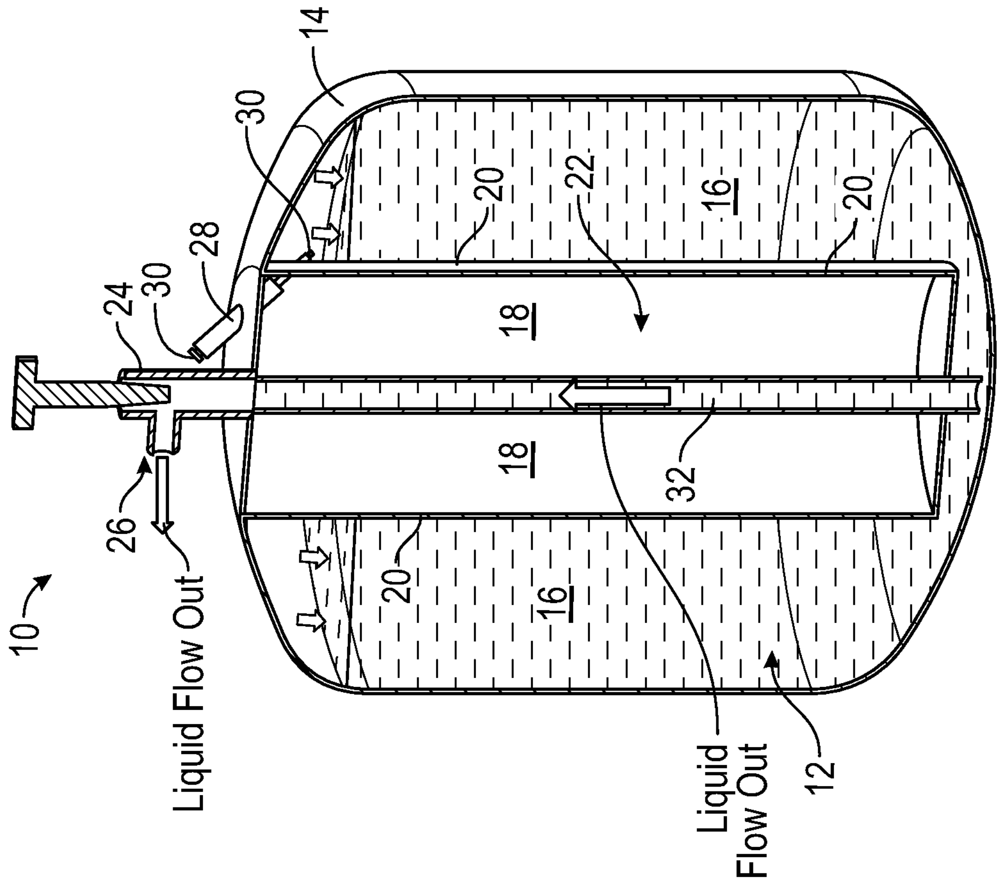
FIG. 2 is top-side sectional perspective view of the tank of FIG. 1, depicting a puncture device puncturing a wall of the propellant chamber separating the propellant from the subject fluid storage chamber.
Figure 1:
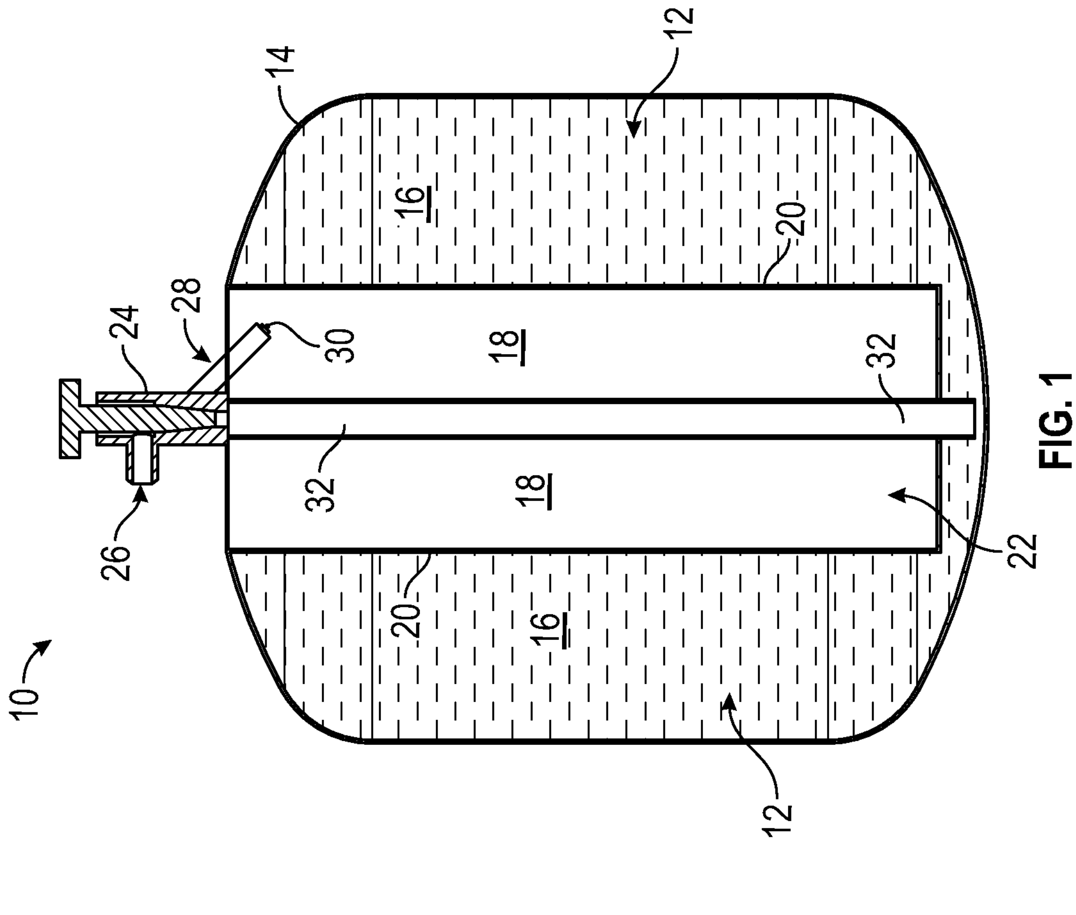
FIG. 1 is a sectional side view of a dual-chamber fluid storage and dispensing tank having a selectively puncturable propellant chamber and a subject fluid storage chamber, in accordance with an embodiment of the present invention.

Referring to the illustrative embodiment of FIGS. 1 and 2, a self-contained two-chambered fluid storage and dispensing tank 10 is provided for the storage and subsequent discharging of a subject fluid 12, such as a reactive adhesive fluid. The fluid tank 10 has a main canister body 14 which may be similar to any commonly available fluid storage and discharge canister or cylinder.

The canister body 14 houses a first storage chamber 16 defined between the outer wall of the canister body 14 and a second storage chamber 18 defined by a sealed, and preferably rigid, membrane 20 disposed inside of and/or adjacent to the first chamber 16. The first chamber 16 is provided for the storage of the subject fluid and the second chamber 18 is provided for the storage of a propellant 22 (FIGS. 1 and 2), such as a compressed gas, which is stored independently of the subject fluid 12. The tank 10 includes a fill and discharge valve 24 at an upper portion of the canister body 14. The valve 24 is selectively operable to open and close/seal the canister body 14 to permit filling or discharge of the first storage chamber 16. The valve 24 may be similar to commonly available fill and discharge valves, however, it will be appreciated that the valve 24 may be configured for additional functions, such as further permitting filling or emptying of the propellant 22 from the second storage chamber 18. The valve 24 includes a fill and discharge port 26 for receiving (when filling) or discharging a subject fluid from the first storage chamber 16 (FIGS. 1 and 2).

The tank 10 includes a puncture device 28 that is selectively operable to puncture the membrane 20 of the second storage chamber 18 to release the propellant 22 into the first storage chamber 16 (FIG. 2). The membrane 20 of the second storage chamber 18 is formed by a rigid cylindrical body that remains sealed until a user selectively punctures the membrane 18 by utilizing the puncture device 28. The puncture device 28 includes a selectively slidable pin 30 that is manipulatable or operable from an exterior of the canister body 14 such that applying a pressing force to the pin 30 urges the pin to slide toward the membrane 20 of the second storage chamber 18 until the pin punctures or pierces the membrane (see distal end of pin 30 puncturing membrane 20 in FIG. 2). Once the membrane 20 is punctured/pierced, the pressurized propellant 22 escapes through the puncture hole and into the first storage chamber 16 where it expands and interacts with the subject fluid 12. The propellant 22 may at least partially mix with the subject fluid 12, however, it will be appreciated that the main function of the propellant 22 is to expand into the first storage chamber 16 and increase the pressure or supply a generally consistent pressure acting on the upper layer of the subject fluid 12 to urge the subject fluid 12 downward in the tank 10 (FIG. 2), similar to that illustrated in FIG. 10.

While the puncture device 28 is described herein as a slideable pin for puncturing a membrane 20, it will be appreciated that other devices and methods may be provided to release the contents of the second storage chamber 18 into the first storage chamber 16. For example, a selectively openable door or tab may be provided in the membrane 20 of the second storage chamber 18, wherein the selectively openable door may be selectively closed to re-seal the membrane 20 such as to permit refilling of the second storage chamber 18 and reuse of the tank 10.

The tank 10 includes a fluid pickup tube or discharge conduit 32, which may be formed and function in the same or substantially similar manner as commonly available fluid storage and discharge tanks. The discharge conduit 32 is positioned within the tank 10 and is in fluid communication with the first storage chamber 16 and the fill and discharge port 26 of the valve 24. The discharge conduit 32 extends through the cylindrical body of the second storage chamber 18 and the second storage chamber 18 is sealed around the discharge conduit 32. In this manner, the propellant may be stored within the tank 10 and canister body 14 but independent of the subject fluid 12 until such time as a user is ready to discharge the subject fluid 12 from the tank 10. By storing the subject fluid 12 and the propellant 22 independent of one another, the shelf-life of the tank 10 and its contents is greatly increased as compared to systems which store the propellant and subject fluid in an intermixed fashion, such as that shown in FIGS. 9 and 10, for example.

The following provides an exemplary operation of the fluid storage and discharge tank 10. With a downstream fluid discharge/application system coupled to the discharge port 26, a user may open the valve 24 and then depress or manipulate the puncture device 28 until the pin 30 has punctured the membrane 20 of the second storage chamber 18. The propellant then releases into the first storage chamber 16 and expands to create a void between the upper portion of the canister body 14 and the upper layer of the subject fluid 12. When a user opens a valve on the downstream application system, the propellant 22 forces or urges the subject fluid 12 downward which in turn forces the subject fluid 12 into the fluid discharge conduit 32 in which the fluid moves upward and then out of the discharge port 26 and into the downstream application system where it is ultimately dispensed in the desired application method (e.g. spatter coat, serpentine, etc.). The downstream fluid discharge/application system may utilize a dispensing system similar to that disclosed in U.S. patent application Ser. No. 16/995,442 to Hammerlund, for a Multiple Part Fluid Application Split Manifold.

In the following exemplary embodiments, like components, as compared to tank 10 and/or the proceeding embodiments, are designated by like reference numerals throughout the various figures.

Figure 4:
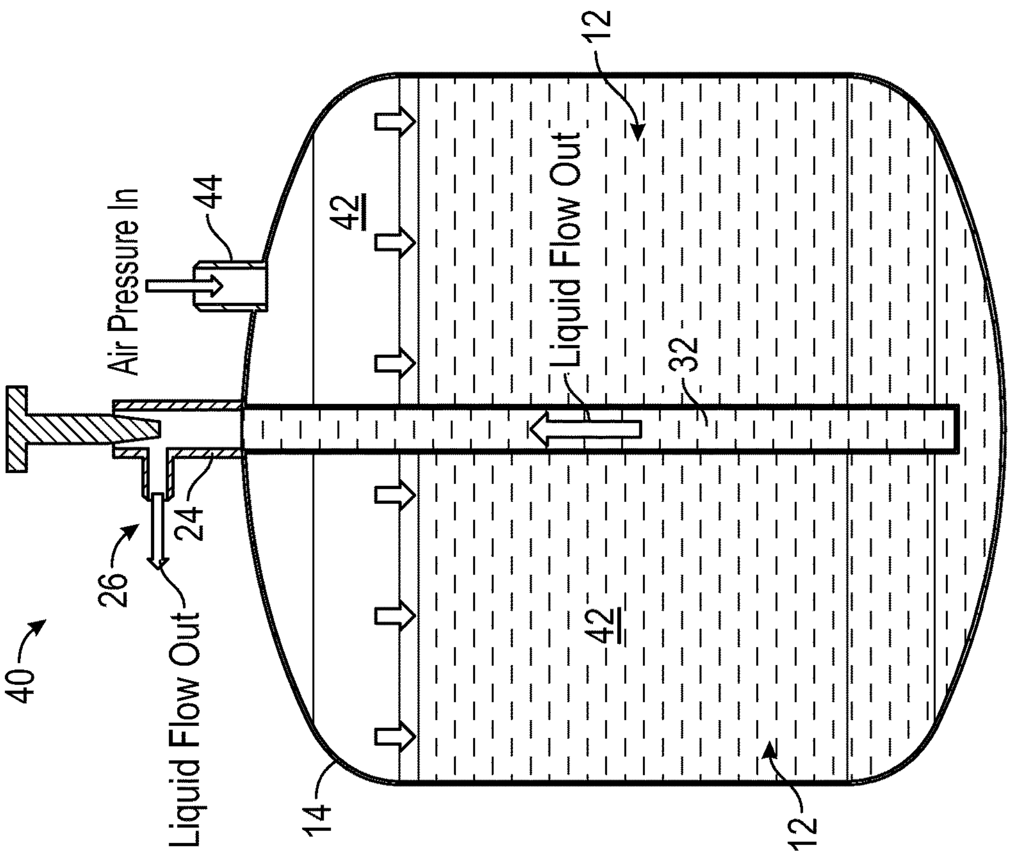
FIG. 4 is another sectional side view of the tank of FIG. 3, depicting the operation of the tank utilizing auxiliary compressed gas, such as compressed air.
Figure 3:
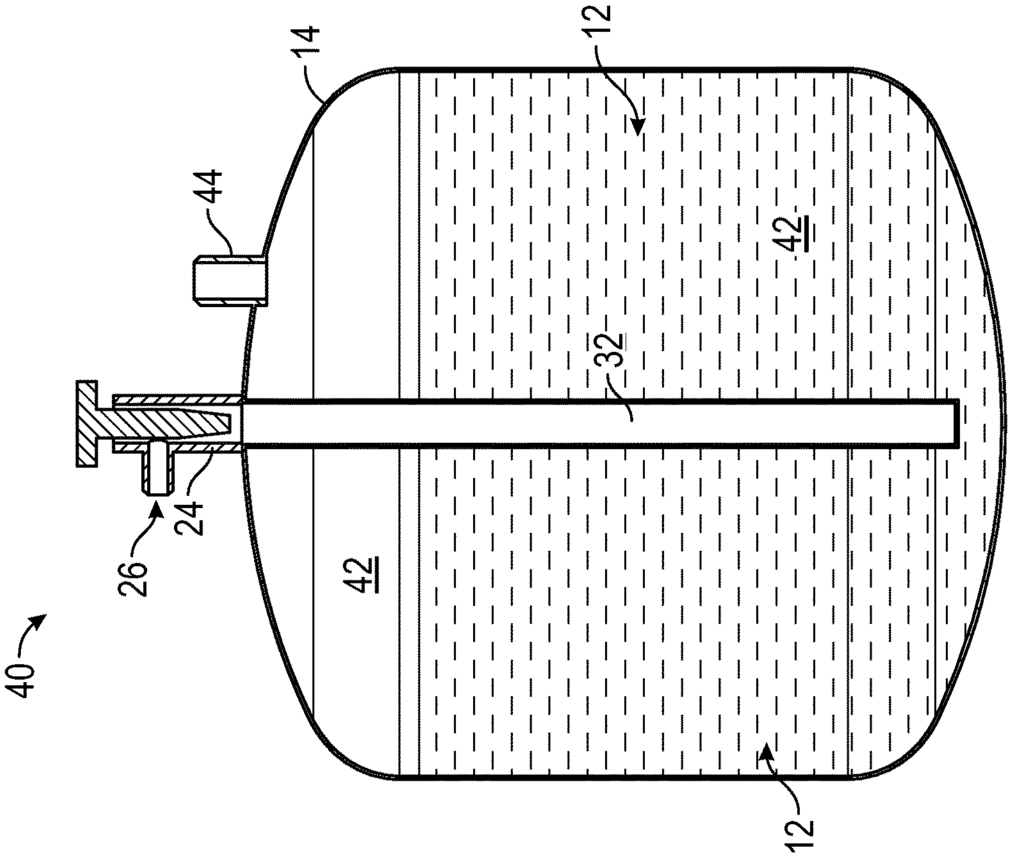
FIG. 3 is a sectional side view of single-chamber fluid storage and dispensing tank, in accordance with another embodiment of the present invention.

Referring now to illustrative embodiment of FIGS. 3 and 4, a single chambered fluid storage and dispensing tank 40 is provided for storing and subsequent discharging of a subject fluid 12, such as a reactive adhesive, for example. The tank 40 includes a main canister body 14 defining a subject fluid storage chamber 42 for storage of the subject fluid 12. The tank 40 includes a fill and discharge valve 24 at an upper portion of the canister body 14 to open or close/seal the canister body 14 to permit filling or discharge of the storage chamber 42. The valve includes a fill and discharge port 26 for receiving or discharging a subject fluid from the storage chamber 42. A fluid pickup tube or discharge conduit 32 is disposed inside of the tank 40 and is in fluid communication between the storage chamber 42 and the fill and discharge port 26. The tank 40 includes an auxiliary gas connection port 44 at an upper portion of the canister body 14, proximate the valve 24. The gas connection port 44 receives an auxiliary compressed gas from a remote source, such as an air compressor operating at about one hundred to two hundred and fifty pounds per square inch (100-250 psi) or an auxiliary pressurized propellant storage tank, for example. In the illustrated embodiment of FIGS. 3 and 4, the subject fluid is stored in the tank 40 in the absence of any propellants. Accordingly, the stored fluid is not substantially prone to degradation during storage, and therefore the shelf life of the tank 10 and subject fluid 12 is significantly greater than commonly available storage and dispensing tanks which store a subject fluid intermixed with a propellant. Preferably, the auxiliary compressed gas is compressed air which does not introduce any volatile chemicals into the tank 40 and subject fluid 12. Accordingly, no additional protective equipment or remediation measures are necessary due to the propellant (i.e. air) being non-volatile. The only equipment or remediation required is based on the subject fluid itself.

The following provides an exemplary operation of the single-chamber fluid storage and discharge tank 40 as depicted in FIG. 4. With a downstream fluid discharge/application system coupled to the discharge port 26 and an upstream auxiliary gas source coupled to the gas connection port 44, a user may open the valve 24 and then introduce a compressed gas into the storage chamber 42 from the gas source. When a compressed gas is introduced into the storage chamber 42, the compressed gas expands into or otherwise creates a void in the storage chamber 42 between the upper portion of the canister body 14 and the upper layer of the subject fluid 12. The compressed gas increases in volume as it expands inside the storage chamber 42 and thereby increases pressure above the subject fluid 12. As such, the increased pressure forces or urges the subject fluid 12 downward which in turn forces the subject fluid 12 into the fluid discharge conduit 32 in which it moves upward and then out of the discharge port 26 and into the downstream application system where it is ultimately dispensed in the desired application method (e.g. spatter coat, serpentine, etc.). In the illustrated embodiment, the gas connection port 44 is positioned proximate the valve 24 and at a generally opposite end of the canister body 14 from the bottom opening orifice or inlet end of the fluid discharge conduit 32 (FIGS. 3 and 4). In this manner, it is preferable that the tank 40 is positioned in an upright manner when in use, as the compressed gas must remain above the subject fluid in order to force the subject fluid into the discharge conduit 32. If the tank 40 is improperly oriented, the compressed gas may bypass the subject fluid and escape through the discharge conduit, as will be appreciated.

Figure 6:
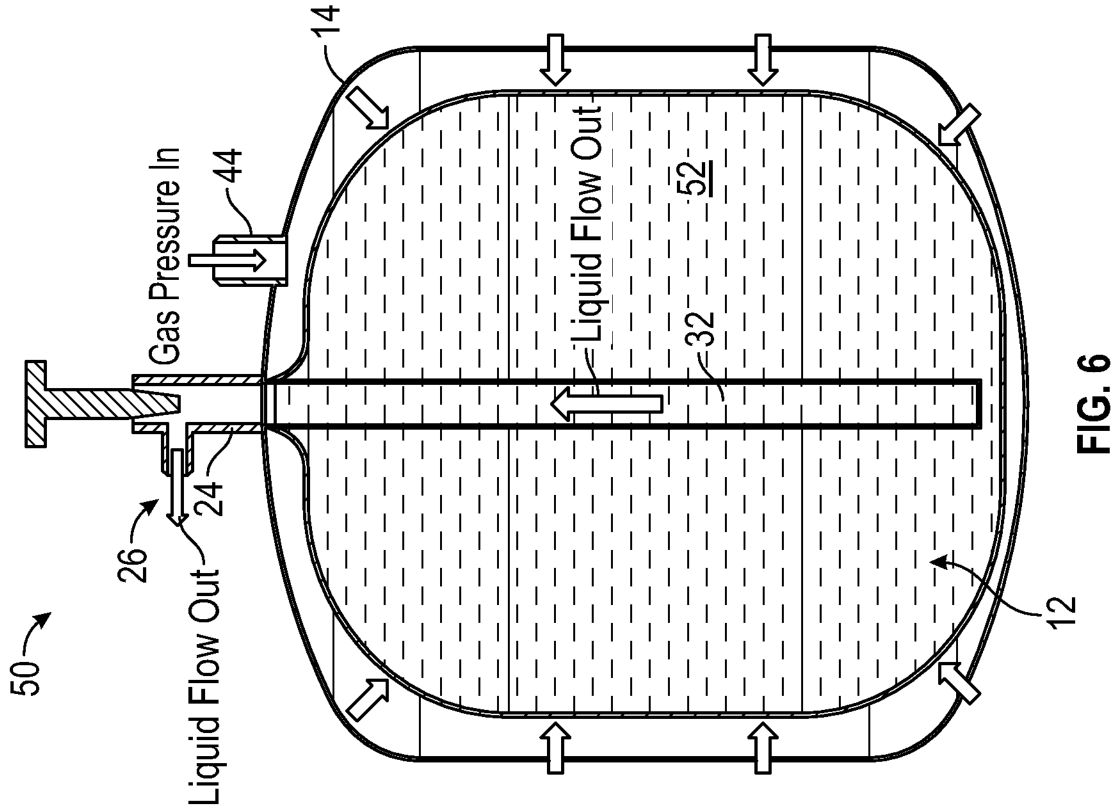
FIG. 6 is another sectional side view of the tank of FIG. 5, depicting the operation of the tank utilizing auxiliary compressed gas.
Figure 5:
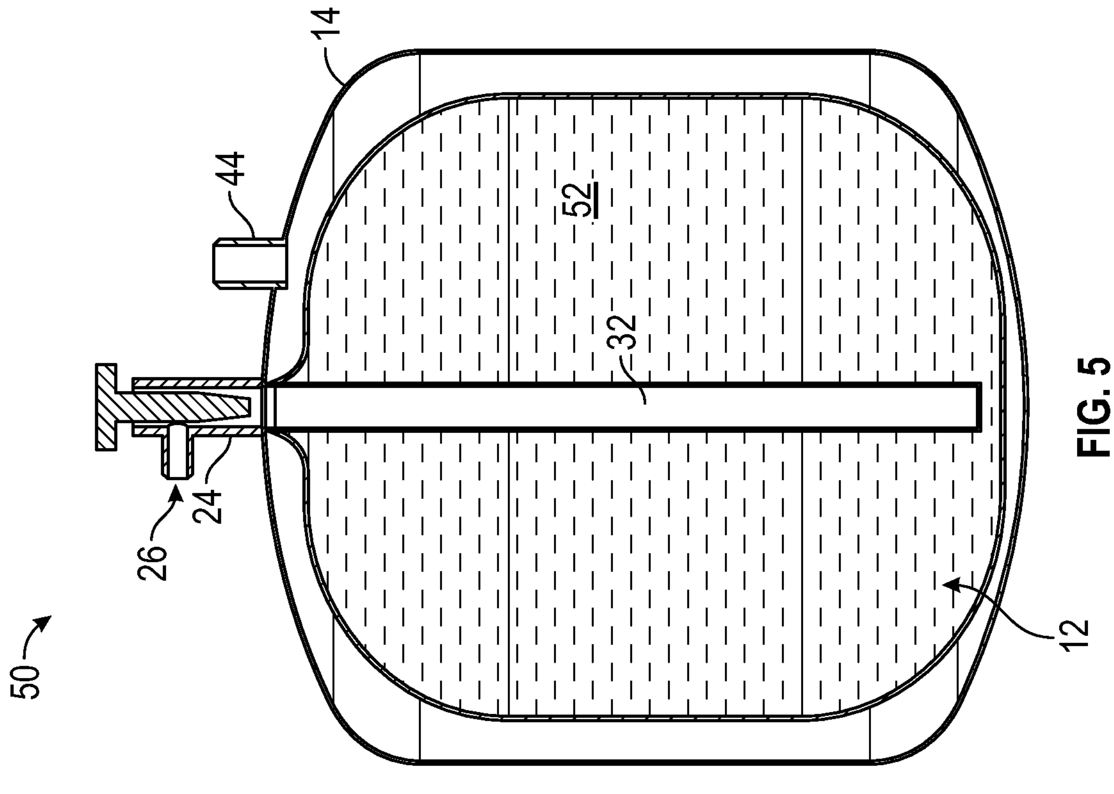
FIG. 5 is a sectional side view of a dual-chamber fluid storage and dispensing tank having a flexible membrane wall, in accordance with a further embodiment of the present invention.

Referring now to illustrative embodiment of FIGS. 5 and 6, a dual-chambered fluid storage and dispensing tank 50 having a flexible bladder 52 is provided for storing and subsequent discharging of a subject fluid 12, such as a reactive adhesive, for example. The tank 50 includes a main canister body 14 and the flexible membrane or bladder 52 inside of the canister body 14. The bladder 52 defines a subject fluid storage chamber. A majority of the bladder 52 is independent or unattached from the canister body 14 such that the bladder is readily deformable independent of the canister body 14. The tank 50 includes a fill and discharge valve 24 at an upper portion of the canister body 14. The valve 24 is selectively operable to open or close/seal the canister body 14 to permit filling or discharge of the bladder 52. The valve 24 includes a fill and discharge port 26 for receiving or discharging a subject fluid from the bladder 52. The tank 50 includes a fluid pickup tube or discharge conduit 32 in fluid communication between the bladder 52 and the fill and discharge port 26. Optionally, the discharge conduit may include perforations along the tube which facilitate the entry of the subject fluid into the discharge conduit. An auxiliary gas connection port 44 is provided with the tank 50 near an upper portion of the canister body 14. The gas connection port 44 receives an auxiliary compressed gas from a remote source. Preferably, the auxiliary compressed gas is compressed air.

Compressed gas that is introduced through the gas connection port 44 fills a void defined between an outer wall of the canister body 14 and the bladder 52, without entering or passing through the bladder. When the valve 24 is open and a compressed gas is introduced through the gas connection port 44 into the main canister body 14, the expanding compressed gas exerts a pressure on the exterior of the bladder 52 causing the bladder to collapse, thereby forcing the subject fluid inside the bladder into the fluid discharge conduit 32 and out of the fill and discharge port 26.

In the illustrated embodiment, the bladder 52 is formed of a resilient, flexible material such that the bladder/storage chamber is refillable via the fill and discharge port and thereby the tank may be reused multiple times (FIGS. 5 and 6). Because the bladder 52 is readily deformable within the tank 50 and around the discharge conduit 32, when the compressed gas is continuously introduced into the tank 50, the bladder 52 and the discharge conduit 32 cooperate to force substantially all of the subject fluid 12 from the bladder 52 into the discharge conduit 32 and thereby discharge substantially all of the subject fluid 12 from the tank 50, regardless of the orientation of the tank. In other words, the tank 50 of the illustrative embodiment of FIGS. 5 and 6 may be operable with the tank positioned in any orientation. For example, if the tank is upside down, the compressed gas may still be introduced into the tank 50 without any subject fluid 12 leaking out of the tank 50, such as at gas connection port 44. The bladder 52 will still collapse under the pressure of the compressed gas. The subject fluid 12 inside the bladder 52 would then be forced into the discharge conduit 32 and ultimately out of the discharge port 26, even when the tank is upside down.

The following provides an exemplary operation of the dual-chamber fluid storage and discharge tank 50 as depicted in FIG. 6. With a downstream fluid discharge/application system coupled to the discharge port 26 and an upstream auxiliary gas source coupled to the gas connection port 44, a user may open the valve 24 and then introduce a compressed gas into the main canister body 14 from the gas source. When a compressed gas is introduced into the main canister body 14, the compressed gas expands into or otherwise creates a void in main canister body 14 between the outer walls of the canister body 14 and the exterior of the bladder 52. The compressed gas increases in volume as it expands inside the main canister body 14 and thereby increases pressure on the exterior of the bladder 52. As such, the increased pressure forces or urges the bladder 52 to deform or contract inward which in turn forces the subject fluid 12 into the fluid discharge conduit 32. The subject fluid 12 then moves upward in the discharge conduit 32 and then out of the discharge port 26 and into the downstream application system where it is ultimately dispensed in the desired application method (e.g. spatter coat, serpentine, etc.).

Figure 8:
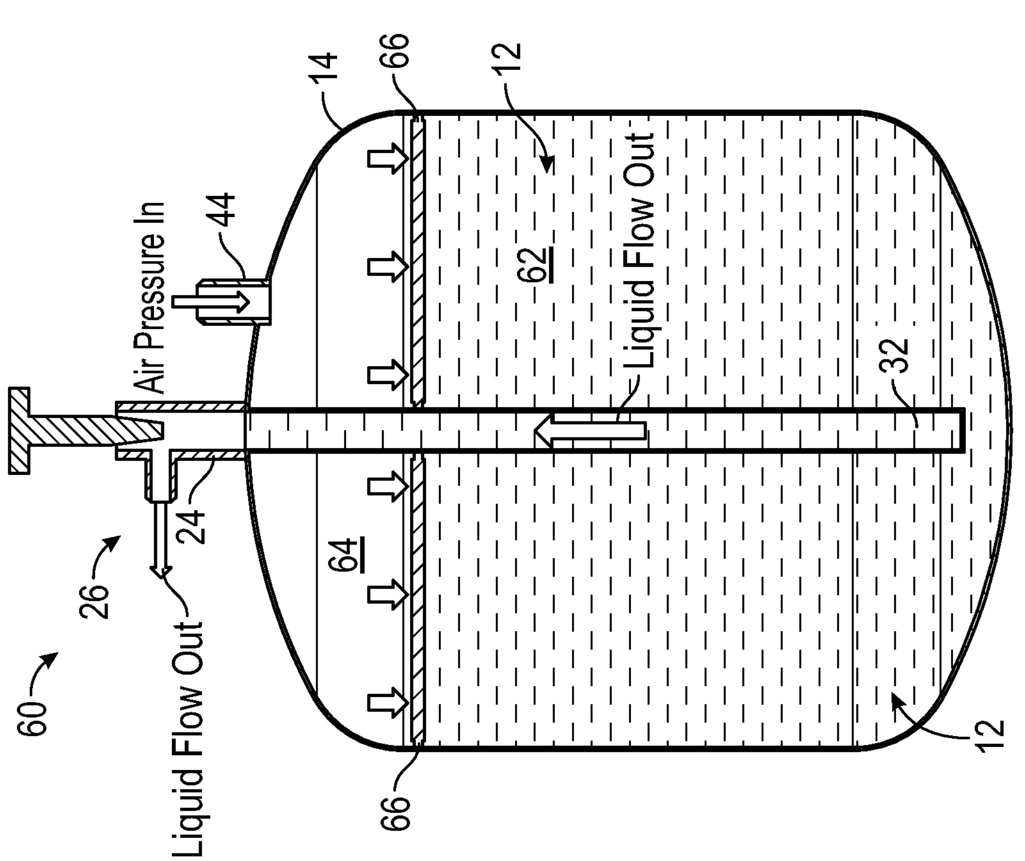
FIG. 8 is another sectional side view of the tank of FIG. 7, depicting the operation of the tank utilizing auxiliary compressed gas, such as compressed air.
Figure 7:
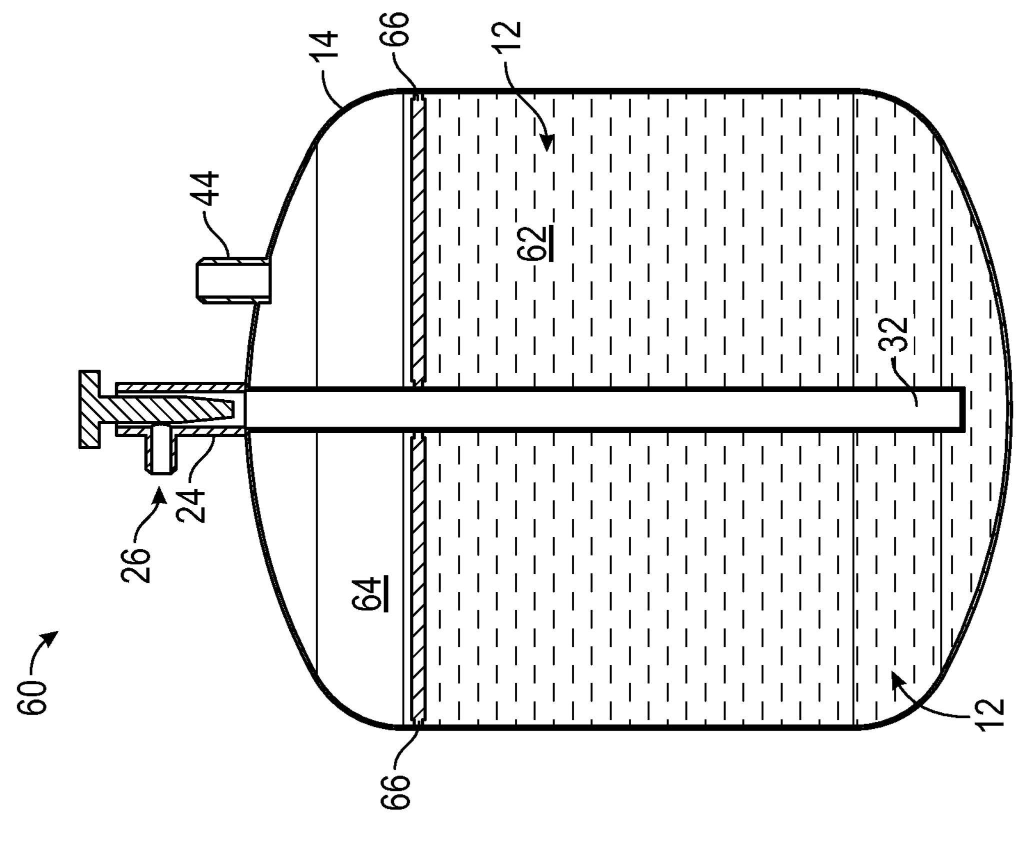
FIG. 7 is a sectional side view of a dual-chamber fluid storage and dispensing tank in which the chambers each have a variable volume, in accordance with another embodiment of the present invention.

Referring now to illustrative embodiment of FIGS. 7 and 8, a dual chambered fluid storage and dispensing tank 60 is provided for storing and subsequent discharging of a subject fluid 12, such as a reactive adhesive, for example. The tank 60 includes a main canister body 14 defining a subject fluid storage chamber 62 for storage of the subject fluid 12 and an upper chamber 64 above the subject fluid storage chamber 62. A piston, plunger, or moveable sealed divider 66 is moveably positioned between the subject fluid storage chamber 62 and the upper chamber 64. The chambers 62 and 64 each have variable volumes that change proportionately relative to one another as the piston 66 moves up and down inside the tank 60. The tank 60 includes a fill and discharge valve 24 at an upper portion of the canister body 14 to open or close/seal the canister body 14 to permit filling or discharge of the storage chamber 62. The valve 24 includes a fill and discharge port 26 for receiving or discharging a subject fluid from the storage chamber 62. A fluid pickup tube or discharge conduit 32 is disposed inside of the tank 60 and is in fluid communication between the storage chamber 62 and the fill and discharge port 26. The tank 60 includes an auxiliary gas connection port 44 at an upper portion of the canister body 14, proximate the valve 24. The gas connection port 44 receives an auxiliary compressed gas from a remote source, such as an air compressor operating at about one hundred to two hundred and fifty pounds per square inch (100-250 psi) or an auxiliary pressurized propellant storage tank, for example. In the illustrated embodiment of FIGS. 7 and 8, the subject fluid is stored in the tank 60 in the absence of any propellants. Accordingly, the stored fluid is not substantially prone to degradation during storage, and therefore the shelf life of the tank 60 and subject fluid 12 is significantly greater than commonly available storage and dispensing tanks which store a subject fluid intermixed with a propellant. Preferably, the auxiliary compressed gas is compressed air which does not introduce any volatile chemicals into the tank 60 and subject fluid 12. Accordingly, no additional protective equipment or remediation measures are necessary due to the propellant (i.e. air) being non-volatile. The only equipment or remediation required is based on the subject fluid itself.

The following provides an exemplary operation of the dual chamber fluid storage and discharge tank 60 as depicted in FIG. 8. With a downstream fluid discharge/application system coupled to the discharge port 26 and an upstream auxiliary gas source coupled to the gas connection port 44, a user may open the valve 24 and then introduce a compressed gas into the upper chamber 64 from the gas source. When a compressed gas is introduced into the upper chamber 64, the compressed gas expands into or otherwise creates a void in the upper chamber 64 between the upper portion of the canister body 14 and the upper portion of the piston 66. The compressed gas increases in volume as it expands inside the upper chamber 64 and thereby increases pressure above the piston 66. As such, the increased pressure forces or urges the piston 66 downward which in turn forces the subject fluid 12 into the opening orifice of the fluid discharge conduit 32. The subject fluid then moves upward through the fluid discharge conduit and then out of the discharge port 26 and into the downstream application system where it is ultimately dispensed in the desired application method (e.g. spatter coat, serpentine, etc.). In the illustrated embodiment, the gas connection port 44 is positioned proximate the valve 24 and at a generally opposite end of the canister body 14 from the bottom opening orifice of the fluid discharge conduit 32 (FIGS. 7 and 8).

In the illustrated embodiment of FIGS. 7 and 8, the piston may include a flexible, resilient seal around the outer circumference of the piston and a flexible, resilient seal around the inner circumference of the piston. The seal at the outer circumference forms a seal between the piston 66 and the interior wall of the canister body 14 and the seal at the inner circumference forms a seal between the piston 66 and the fluid discharge conduit 32. As such, the subject fluid storage chamber 62 is refillable via the fill and discharge port 26 and the fluid discharge conduit 32 and thereby the tank 60 may be reused multiple times. When the compressed gas is continuously introduced into the tank 60, the piston 66 and the discharge conduit 32 cooperate to force substantially all of the subject fluid 12 from the subject fluid storage chamber 62 into the discharge conduit 32 and thereby discharge substantially all of the subject fluid 12 from the tank 60, regardless of the orientation of the tank. In other words, the tank 60 of the illustrative embodiment of FIGS. 7 and 8 may be operable with the tank positioned in any orientation. For example, if the tank is upside down, the compressed gas may still be introduced into the tank 60 without any subject fluid 12 leaking out of the tank 60 or into the upper chamber 64. The piston 66 will still move toward the end of the fluid discharge conduit 32 under the pressure of the compressed gas. The subject fluid 12 inside the subject fluid storage chamber 62 would then be forced into the discharge conduit 32 and ultimately out of the discharge port 26, even when the tank 60 is upside down.

A method is provided for storing and operating a self-contained dual-chamber fluid storage and dispensing tank, such as tank 10 described above and depicted in FIGS. 1 and 2. The method includes filling a subject fluid storage chamber 16 of a self-contained dual-chamber fluid storage and dispensing tank 10 with a subject fluid 12 and a filling a propellant storage chamber 18 of the tank with a propellant 22. The propellant storage chamber 18 is positioned adjacent to or within the subject fluid storage chamber 16, such as depicted in FIGS. 1 and 2. The method includes storing the tank until the tank is needed for application of the subject fluid. The subject fluid 12 and the propellant 22 are stored and maintained independent of one another in order to prolong the shelf life of the subject fluid during storage.

When the tank is required for application of the subject fluid, the method includes coupling a fluid discharge system, such as that described above as being disclosed in U.S. patent application Ser. No. 16/995,442, to a fill and discharge port 26 of a tank valve 24 of the tank 10. Then, opening the tank valve 24 and subsequently puncturing a membrane 20 of the propellant storage chamber 18 with a puncture device, such as puncture device 28 described above, in order to release the propellant 22 into the subject fluid storage chamber 16. Once the propellant begins to expand into the subject fluid storage chamber, the method includes discharging the subject fluid from the tank through a fluid discharge conduit 32 that is positioned inside the tank and from the discharge conduit 32 into the fluid discharge system that is coupled to the fill and discharge port 26. The discharging of the subject fluid 12 from the tank is performed as a function of the propellant 22 expanding inside the subject fluid storage chamber 16 above the subject fluid 12. As the volume of the propellant 22 inside the subject fluid storage chamber 16 increases, the subject fluid 12 is forced or urged downward by the increased pressure and thereby forced into and upward through the fluid discharge conduit 32 and ultimately out of the fill and discharge port 26.

Another method is provided for storing and operating a single-chambered fluid storage and dispensing tank, such as tank 40 described above and depicted in FIGS. 3 and 4. The method includes filling a subject fluid storage chamber 42 of a single-chamber fluid storage and dispensing tank 40 with a subject fluid 12, such as a reactive adhesive or foam. The storage chamber 42 is defined by the outer wall of the tank canister 14. The tank also includes an auxiliary gas connection port 44 for receiving an auxiliary compressed gas system, such as hose of an air compressor. The method includes storing the tank until the tank is needed for application of the subject fluid. The single chamber tank does not contain any propellants, and thus the subject fluid 12 is stored and maintained independently which may prolong the shelf life of the subject fluid during storage.

When the tank is required for application of the subject fluid, the method includes coupling a fluid discharge system, such as that described above as being disclosed in U.S. patent application Ser. No. 16/995,442, to a fill and discharge port 26 of a tank valve 24 of the tank 40 and coupling an auxiliary compressed gas system to the gas connection port 44. Then, opening the tank valve 24 and subsequently introducing a compressed gas into the tank through the gas connection port 44. Once the compressed gas begins to expand into the storage chamber 42 above the subject fluid 12, the method includes discharging the subject fluid 12 from the tank through a fluid discharge conduit 32 that is positioned inside the tank and from the discharge conduit 32 into the fluid discharge system that is coupled to the fill and discharge port 26. The discharging of the subject fluid 12 from the tank 40 is performed as a function of the compressed gas expanding inside the storage chamber 42 above the subject fluid 12. As the volume of the compressed gas inside the subject fluid storage chamber 42 increases, the subject fluid 12 is forced or urged downward by the increased pressure and thereby forced into and upward through the fluid discharge conduit 32 and ultimately out of the fill and discharge port 26.

Another method is provided for storing and operating a dual-chambered fluid storage and dispensing tank having a flexible membrane storage chamber, such as tank 50 described above and depicted in FIGS. 5 and 6. The method includes filling a subject fluid storage chamber 52 of a dual-chamber fluid storage and dispensing tank 50 with a subject fluid 12, such as a reactive adhesive or foam. The subject fluid storage chamber 52 is defined by a flexible membrane or bladder 52 installed within the tank. The tank includes a void chamber defined by the outer walls of the tank and the exterior of the bladder 52. The tank also includes an auxiliary gas connection port 44 which receives an auxiliary compressed gas system, such as hose of an air compressor. The method includes storing the tank until the tank is needed for application of the subject fluid. The dual-chamber tank does not contain any propellants, and thus the subject fluid is stored and maintained independently which may prolong the shelf life of the subject fluid during storage.

When the tank is required for application of the subject fluid, the method includes coupling a fluid discharge system, such as that described above as being disclosed in U.S. patent application Ser. No. 16/995,442, to a fill and discharge port 26 of a tank valve 24 of the tank 50 and coupling an auxiliary compressed gas system to the gas connection port 44. Then, opening the tank valve 24 and subsequently introducing a compressed gas through the gas connection port 44 and into the void space between the outer wall of the tank canister 14 and the bladder 52. Once the compressed gas begins to expand into the void around the bladder 52, the method includes discharging the subject fluid 12 from the tank through a fluid discharge conduit 32 that is positioned inside the bladder 52 and from the discharge conduit 32 into the fluid discharge system that is coupled to the fill and discharge port 26. The discharging of the subject fluid 12 from the tank 50 is performed as a function of the compressed gas expanding inside the void space around the bladder 52 (without entering the bladder). As the volume of the compressed gas inside the void increases, the bladder 52 collapses under the increased pressure from the compressed gas and the subject fluid 12 inside the bladder 52 is forced or urged toward the opening of the fluid discharge conduit 32 and then forced into and upward through the fluid discharge conduit 32 and ultimately out of the fill and discharge port 26. Preferably, the tank 50 with bladder 52 is refillable and reusable. Accordingly, the method may include refilling the bladder 52 with more of a subject fluid 15 via the fill and discharge port 26 and then closing the valve 24 and storing the re-filled tank until required for application.

Thus, multiple tank embodiments and methods are disclosed for storing a reactive subject fluid and for dispensing that fluid from the storage tank. The tanks and methods provide for the storage of a subject fluid independent of propellants that may degrade the subject fluid if stored in combination with propellants. When the tank is ready to be used to dispense the subject fluid, a propellant is released or introduced into or proximate/around the storage chamber that contains the subject fluid to propel or force the subject fluid out of the tank and into a fluid discharge system, such as a spray gun or bead dispenser. In some embodiments, the tank is refillable and reusable, thereby reducing waste products from dispensing these types of fluids. In some embodiments, the propellant is non-volatile, compressed air and as such no additional safety precautions are required which may otherwise be required when utilizing volatile propellants.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A fluid storage and dispensing tank comprising:
- a sealed main canister body;
- a subject fluid storage chamber defining a portion said main canister body and configured for storing a subject fluid;
- a propellant storage chamber disposed inside said main canister body and configured for storing a propellant independent of said subject fluid storage chamber;
- a selectively openable device operable to form a hole in said propellant storage chamber to release the propellant into said subject fluid storage chamber; and
- a valve that is selectively operable to permit the subject fluid to discharge from said subject fluid storage chamber;
- a fluid discharge conduit disposed between said subject fluid storage chamber and said valve;
- wherein said propellant storage chamber is defined by a sealed membrane disposed inside of said subject fluid storage chamber and configured for storing a propellant independent of the subject fluid, and wherein said sealed membrane of said propellant storage chamber comprises a rigid cylindrical body disposed inside of said main canister body and remains sealed until selectively opened by said selectively openable device, and wherein said fluid discharge conduit extends through said cylindrical body of said propellant storage chamber.

2. The fluid storage and dispensing tank of claim 1, wherein said selectively openable device comprises a selectively slidable pin that is manipulatable from an exterior of said canister body to puncture said sealed membrane of said propellant storage chamber to form the hole in the membrane of said propellant storage chamber.

3. The fluid storage and dispensing tank of claim 1, wherein when said valve is open and the propellant is released into said subject fluid storage chamber, the propellant forces the subject fluid into said fluid discharge conduit and out of said valve.

4. The fluid storage and dispensing tank of claim 3, wherein said sealed membrane of said propellant storage chamber remains sealed until selectively opened by said selectively openable device.

5. A fluid storage and dispensing tank comprising:
- a sealed main canister body;
- a first storage chamber defined by an outer wall of said canister body and configured for storing a subject fluid;
- a second storage chamber defined by a sealed membrane disposed inside of said first storage chamber and configured for storing a propellant independent of the subject fluid;
- a fill and discharge valve disposed at an upper portion of said canister body and selectively operable to open or seal said canister body to permit filling or discharge of said first storage chamber, said valve comprising a fill and discharge port for receiving or discharging a subject fluid from said first storage chamber;
- a selectively openable device operable to form a hole in the membrane of said second storage chamber to release the propellant into said first storage chamber; and
- a fluid discharge conduit disposed between said first storage chamber and said fill and discharge port of said valve;
- wherein when said valve is open and the propellant is released into said first storage chamber, the propellant forces the subject fluid into said fluid discharge conduit and out of said fill and discharge port, wherein said sealed membrane of said second storage chamber comprises a rigid cylindrical body that remains sealed until selectively opened by said selectively openable device, and wherein said fluid discharge conduit extends through said cylindrical body of said second storage chamber.

6. The fluid storage and dispensing tank of claim 5, wherein said selectively openable device comprises a selectively slidable pin that is manipulatable from an exterior of said canister body such that applying a pressing force to the pin urges the pin to slide toward said sealed membrane of said second storage chamber until the pin punctures said sealed membrane to form the hole in the membrane of said second storage chamber.

7. A method of storing a subject fluid in a sealed tank in the absence of a propellant and subsequently discharging the stored subject fluid, said method comprising:
- providing a tank having a fluid storage chamber defined by an outer wall of the tank and filled with a subject fluid and wherein the tank further comprises a propellant storage chamber defined by a sealed membrane disposed inside of the fluid storage chamber, wherein the propellant storage chamber contains a propellant independent of the subject fluid;
- when the tank is required opening a valve of the tank;
- forming a hole in the sealed membrane containing the propellant with a selectively openable device that is accessible from an exterior of the tank to release the propellant into the subject fluid, wherein the sealed membrane of the propellant storage chamber comprises a rigid cylindrical body that remains sealed until selectively opened by the selectively openable device; and
- discharging the subject fluid from the tank through a fluid discharge conduit disposed inside the tank and out of the valve, wherein the fluid discharge conduit is disposed between the fluid storage chamber and the valve and extends through the cylindrical body of the propellant storage chamber;
- wherein said discharging the subject fluid from the tank is performed by the propellant expanding inside the tank above the subject fluid and as the volume of the propellant inside the tank increases, the subject fluid is forced into the fluid discharge conduit and out of the fill and discharge port.

8. The method of claim 7, wherein said forming a hole in the membrane comprises pressing a slidable pin toward the membrane of the propellant storage chamber until the pin punctures the membrane, wherein the slidable pin is manipulatable from an exterior of the tank.

9. The method of claim 7, further comprising filling the subject fluid storage chamber of the tank with the subject fluid; filling the propellant storage chamber of the tank with a propellant, and storing the tank filled with the subject fluid and propellant until required.

10. The method of claim 9, further comprising coupling a fluid discharge system to the valve of the tank.

* * * * *